United States Patent
Blanchard, Jr. et al.

(10) Patent No.: US 7,931,205 B2
(45) Date of Patent: Apr. 26, 2011

(54) PRINTER WITH INTEGRATED RFID DATA COLLECTOR

(75) Inventors: Raymond A. Blanchard, Jr., Dryden, NY (US); Michael R. Brown, Chesire (GB); Regina A. Davis, Waverly, NY (US); Timothy J. Entingh, Waverly, NY (US); Clive G. Jones, Wrexham (GB); Richard E. Roberts, Pine City, NY (US)

(73) Assignee: Avery Dennison Corporation, Pasadena, CA (US)

( * ) Notice: Subject to any disclaimer, the term of this patent is extended or adjusted under 35 U.S.C. 154(b) by 459 days.

(21) Appl. No.: 12/025,470

(22) Filed: Feb. 4, 2008

(65) Prior Publication Data

US 2009/0194588 A1 Aug. 6, 2009

(51) Int. Cl.
*G06K 19/06* (2006.01)
(52) U.S. Cl. ..... 235/492; 235/441; 235/451; 235/462.01
(58) Field of Classification Search .................. 235/375, 235/462.01, 492
See application file for complete search history.

(56) References Cited

U.S. PATENT DOCUMENTS

| | | | |
|---|---|---|---|
| 4,408,906 A | 10/1983 | Wallace | |
| 5,483,624 A * | 1/1996 | Christopher et al. | 358/1.18 |
| 5,524,993 A | 6/1996 | Durst | |
| 5,833,377 A | 11/1998 | Keller et al. | |
| 5,982,336 A * | 11/1999 | Wen et al. | 343/793 |
| 6,246,326 B1 | 6/2001 | Wiklof et al. | |
| 6,327,972 B2 * | 12/2001 | Heredia et al. | 101/35 |
| 7,125,182 B2 | 10/2006 | Campbell et al. | |
| 7,180,627 B2 | 2/2007 | Moylan et al. | |
| 7,190,270 B2 | 3/2007 | Brown et al. | |
| 2001/0029857 A1 | 10/2001 | Heredia et al. | |
| 2004/0032443 A1 * | 2/2004 | Moylan et al. | 347/19 |
| 2004/0100381 A1 | 5/2004 | Waters | |
| 2005/0091821 A1 * | 5/2005 | Best et al. | 29/430 |
| 2005/0116034 A1 | 6/2005 | Satake et al. | |
| 2005/0274800 A1 | 12/2005 | Chapman et al. | |
| 2005/0280537 A1 | 12/2005 | Feltz et al. | |
| 2006/0071063 A1 * | 4/2006 | Duckett | 235/375 |
| 2006/0104689 A1 | 5/2006 | Marowski et al. | |
| 2006/0221363 A1 | 10/2006 | Roth et al. | |
| 2006/0273170 A1 | 12/2006 | Forster et al. | |
| 2007/0152058 A1 * | 7/2007 | Yeakley et al. | 235/462.01 |
| 2008/0093020 A1 | 4/2008 | Ford | |

FOREIGN PATENT DOCUMENTS

| | | |
|---|---|---|
| JP | 8-124356 | 5/1996 |
| JP | 2003-140548 | 5/2003 |
| JP | 2004-110994 | 4/2004 |
| JP | 2005-107991 | 4/2005 |
| JP | 2005-5186567 | 7/2005 |

(Continued)

*Primary Examiner* — Thien M. Le
*Assistant Examiner* — Christopher Stanford

(57) ABSTRACT

A RFID printer for printing and determining the quality of RFID record members having transponders is provided. The RFID printer may be used to print RFID record members utilizing a continuous moving web. In particular, a RFID printer includes an integrated RFID data collector such that identifying RFID transponder information may be recorded and associated with a barcode for inventory tracking purposes. An association file created by the RFID printer may be transferred to a manufacturer or retailer brand owner. The association file may be deleted from the RFID printer upon acknowledgment of receipt of the transmitted association file to the manufacturer or retail brand owner. The RFID printer provides methods for determining quality of RFID printed record members.

13 Claims, 10 Drawing Sheets

FOREIGN PATENT DOCUMENTS

| | | |
|---|---|---|
| JP | 2006-000936 | 1/2006 |
| JP | 2006-004150 | 1/2006 |
| JP | 2007-213298 | 8/2007 |

\* cited by examiner

PRINTER WITH INTEGRATED RFID DATA COLLECTOR

FIELD OF THE INVENTION

The invention relates to RFID printers. More particularly, the invention concerns the ability to operate a RFID printer with an integrated RFID data collector such that RFID transponders may be recorded and associated with barcodes for inventory tracking purposes.

BACKGROUND

RFID (Radio Frequency Identification) class 0 transponders have been embedded in record members to track inventory. The data contained in the transponder is typically read by a stationary RFID read module as the inventory with the RFID transponder is carried past the stationary read module on a conveyor belt or the like. RFID printers are now required to be capable of both printing a bar code on record members, such as labels, tags etc., and capable of reading from a RFID transponder contained in the record member. The bar code may represent information in the form of a SKU identifying an item such as a product or garment.

Using preprogrammed class 0 transponders, inventory may be tracked using a RFID scanner to determine if a product needs to be replenished. Products to be replenished may be determined manually by an operator after completion of a RFID scan. Currently, there exist many problems with RFID printers and systems. For example, current RFID printer systems use external RFID readers and personal computers to store files. These systems do not assure that files are safely communicated and stored with a Retail Brand Owner ("RBO") for inventory tracking purposes. Current systems are not secure and are susceptible to lost or corrupted files. These systems generally store information internally in the memory of the particular RFID printer.

Moreover, additional problems exist with current RFID printer configurations. For instance, existing RFID printers momentarily stop so that a RFID transponder or inlay in a record may be read. However, stopping of a web to read a RFID transponder increases the amount of time for overall job completion and limits overall throughput of the RFID printer. In addition, a number of RFID transponders are damaged during the printing process as current designs of top and bottom feed rollers exert excessive pressures on the transponders as the transponders move along the web.

Additionally, current RFID printers do not provide a visual indication to alert users if a mismatch between the number of record members printed and the number of "good" RFID transponders tracked in the association file have been detected. Furthermore, current RFID printers do not allow users to verify reliability of individual record members containing transponders.

Therefore, there is a need in the art for an improvement to the printing and reading of RFID record members particularly for record members being printed in batch processes.

Further background information regarding thermal printers that print on both sides of a web may be found in co-owned U.S. Pat. No. 7,125,182, issued Oct. 24, 2006 which is incorporated in its entirety.

The following additional patent documents and other literature are made of record and may or may not be prior art: U.S. Pat. Nos. 4,408,906; 5,524,993; 5,833,377; 6,246,326; 7,180,627; 7,190,270; U.S. Publication No. 2001/0029857; U.S. Publication No. 2004/0100381; U.S. Publication No. 2005/0116034; U.S. Publication No. 2005/0274800; U.S. Publication No. 2005/0280537; U.S. Publication No. 2006/0104689; U.S. Publication No. 2006-0273170; U.S. Publication No. 2006-0221363; Abstract of Japan Publication No. 2003-140548; Abstract of Japan Publication No. 2004-110994; Abstract of Japan Publication No. 2005-107991; Abstract of Japan Publication No. 2005-186567; Abstract of Japan Publication No. 2006-000936; Abstract of Japan Publication No. 2007-213298; Abstract of Japan Publication No. 2006-004150; and Abstract of Japan Publication No. 2008-124356.

SUMMARY

In accordance with various aspects of the invention, the disadvantages of prior printers as discussed above have been overcome. One aspect of the present invention provides an RFID printer for printing and determining the quality of RFID record members having transponders. The RFID printer may be used to print RFID record members utilizing a continuous moving web. In particular, a RFID printer includes an integrated RFID data collector such that identifying RFID transponder information may be recorded and associated with a barcode for inventory tracking purposes. An association file may be created by the RFID printer and may be transferred to a manufacturer or RBO. The association file may be deleted from the RFID printer upon acknowledgment of receipt of the transmitted association file to the manufacturer or RBO. In an aspect of the invention, the RFID printer may provide various methods for determining a measure of quality of RFID printed record members.

In an aspect of the invention, a RFID printer is capable of reading and printing a record member while the web is continuously moving. While the web is continuously moving, both sides of the record member may be printed upon with information in barcode form. In an embodiment, the RFID printer may include a RFID reader, a communication interface, and an antenna configured to emit a RFID field. The antenna may also be coupled to and cooperate with the RFID reader to read at least one RFID transponder included in a record member. The antenna may be located upstream of a print head. The RFID printer may include a printing system and a processor operable to read and print on the RFID record member as the web continues in motion.

In an embodiment, the RFID printer may read a RFID transponder to collect an identification number of the RFID transponder. The RFID printer may link the identification number of the RFID transponder with a barcode. An association file may be created which includes a listing of identification numbers of RFID transponders and associated barcodes. The association file may be stored in the RFID printer's non-volatile memory and transmitted upon receipt of an instruction to transmit completed association files.

In another aspect of the invention, the RFID printer may count the number of printed record members printed by the printing system of the RFID printer. The RFID printer may further determine if the counted number of printed record numbers exceeds a stored total number of record numbers allowed to be printed before receipt of an instruction to transmit the association file. In an embodiment, if the counted number of printed records exceeds the stored total number of record numbers allowed to be printed, then printing may be stopped until receipt of an instruction to transmit an association file.

In an additional aspect of the invention, an under cut feed roller assembly may be used with various embodiments of the invention. The under cut feed roller assembly may include top and bottom feed rollers having matching grooves to reduce excess pressure on a transponder.

In yet another aspect of the invention, a RFID printer capable of printing on both sides of a record member and creating an association file linking transponders to barcodes may also comprise a knife assembly to produce a square cut when cutting printed RFID record members.

In a further aspect of the invention, a record member with a RFID transponder may be marked as unusable in an association file and when the record member reaches a print position the record member is printed with an overstrike pattern or cut into pieces preventing accidental use of the defective record member.

In an embodiment, a RFID system may include a RFID printer and a host computer. The RFID printer may include a barcode scanner, a RFID reader, an antenna configured to emit a RFID field and coupled to and cooperating with the RFID reader to read at least one RFID transponder included in a record member, a printing system having a print head and a drive mechanism, and a processor. The processor may be configured to create an association file. The association file may include a listing of identification numbers of RFID transponders and associated barcodes. The RFID system may further include a host computer in communication with the RFID printer. The host computer may receive the association file from the RFID printer upon request and retransmit the association file to a manufacturer or RBO for inventory tracking purposes. The host computer may receive an acknowledgement of receipt of the retransmitted association file. Upon receipt of the acknowledgment, the host computer may instruct the RFID printer to delete the transmitted association file upon receipt of the retransmitted association file.

In a further aspect of the invention, a measure of quality for a RFID transponder may be determined. In an embodiment, a RFID printer may receive an instruction to enter a reader mode to detect RFID transponders. The RFID printer may collect information from a transponder and transmit such information to determine status of the RFID transponder. The information received regarding the RFID transponder may be forwarded through a web server to verify the received RFID transponder information. A first indication may be received if the RFID transponder information is discovered and valid. In an alternative embodiment, a second indication may be transmitted if the RFID transponder information in not discovered or if the RFID transponder is invalid.

In another aspect of the invention, a measure of quality for a RFID transponder may be determined. In an embodiment, a RFID printer may read a RFID transponder included in a record member as the record member advances on a continuous web. The RFID printer may count the number of reads for the RFID transponder and evaluate the RFID transponder based on the number of counted reads. If the number of counted reads is greater than or equal to a predetermined number, the RFID transponder may be marked as acceptable. Alternatively, if the number of counted reads is less than the predetermined number, the RFID printer may be marked as unacceptable. In an aspect of the invention, the predetermined number may be three. In an embodiment, a record member having a transponder that is marked as unacceptable may be over struck or cut into pieces.

BRIEF DESCRIPTION OF THE DRAWINGS

These and other advantages and novel features of the present invention, as well as details of an illustrated embodiment thereof, will be more fully understood from the following description and drawings.

DETAILED DESCRIPTION

One aspect of the present invention provides an RFID printer for printing and determining the quality of RFID record members having transponders. The RFID printer may be used to print RFID record members utilizing a continuous moving web. In particular, a RFID printer includes an integrated RFID data collector such that identifying RFID transponder information may be recorded and associated with a barcode for inventory tracking purposes. An association file may be created by the RFID printer and may be transferred to a manufacturer or RBO. The association file may be deleted from the RFID printer upon acknowledgment of receipt of the transmitted association file to the manufacturer or RBO. In an aspect of the invention, the RFID printer may provide various methods for determining a measure of quality of RFID printed record members.

In an aspect of the invention, a barcode may be printed identifying the SKU of an item on a tag that contains an encapsulated class 0 preprogrammed RFID transponder. The RFID printing system needs to reliably read these preprogrammed RFID transponders and associate them with a SKU printed on the tag or record member. Next, a tag may be placed on a garment or other item of manufacture. The created association files may be provided to the RBO for supply chain management.

Figure 1:
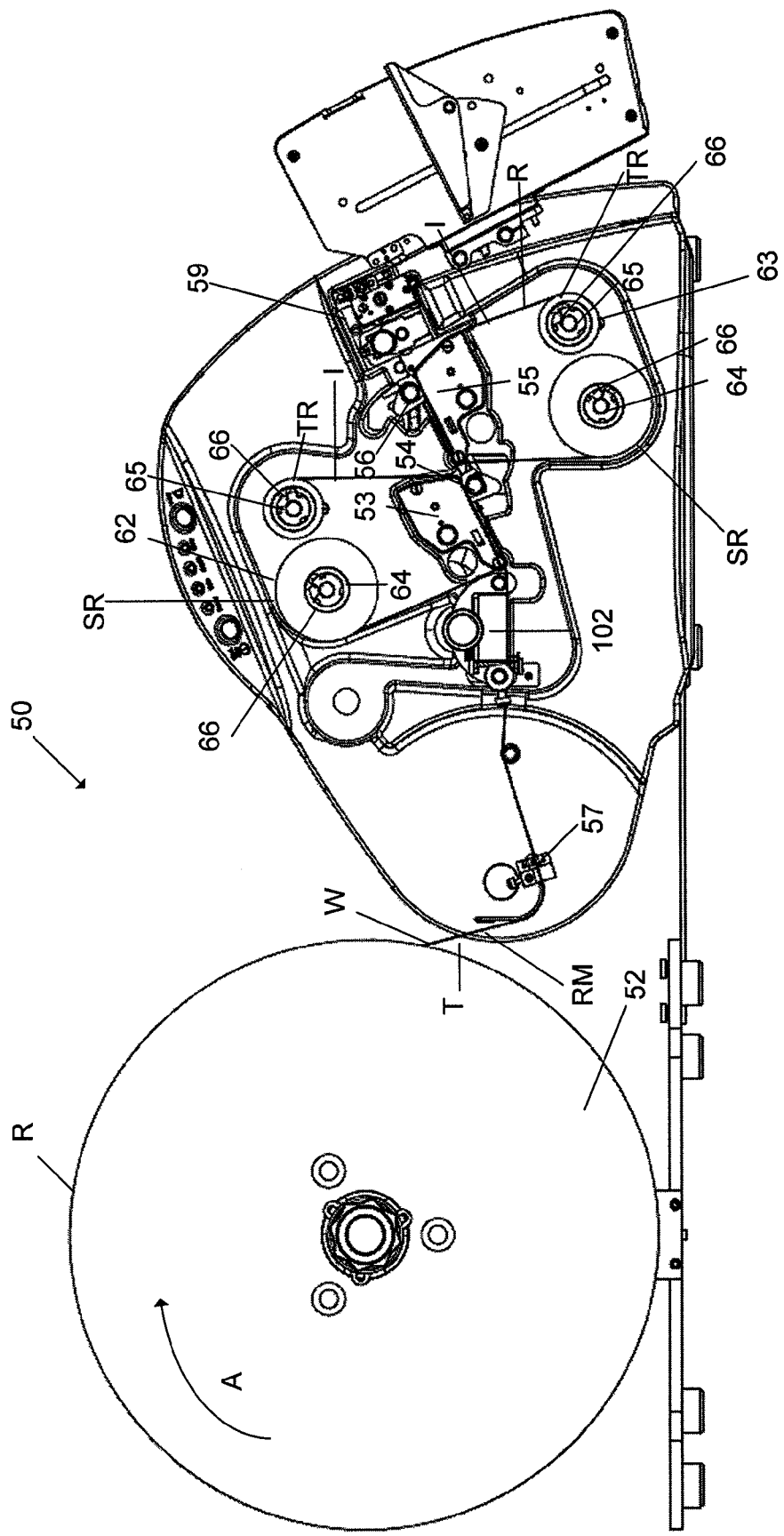
FIG. 1 is a front elevational view of a RFID printer in accordance with an aspect of the invention.
Figure 2:
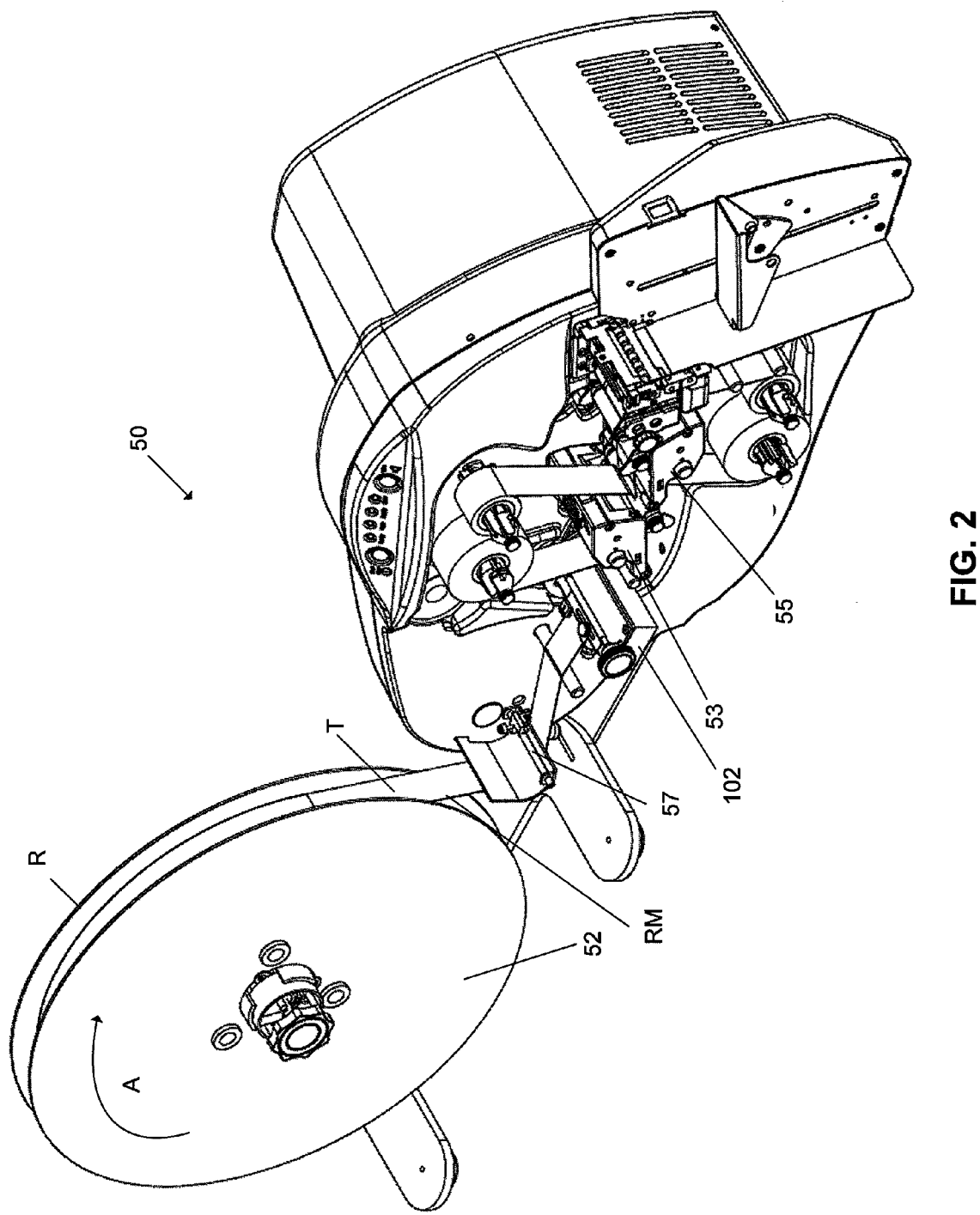
FIG. 2 is side elevational view of a RFID printer in accordance with an aspect of the invention.
Figure 3:
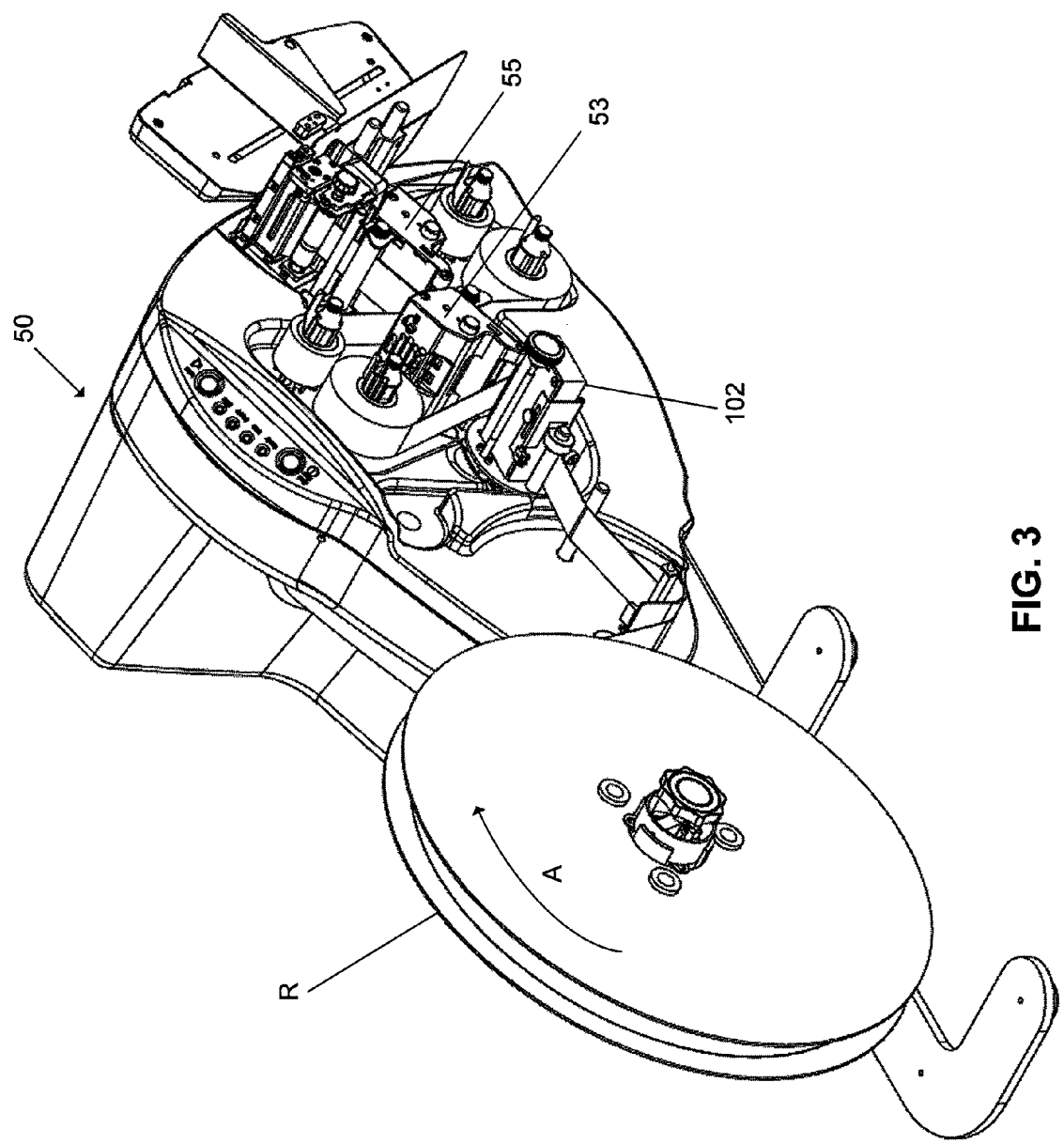
FIG. 3 in another side elevational view of a RFID printer in accordance with an aspect of the invention.
Figure 4:
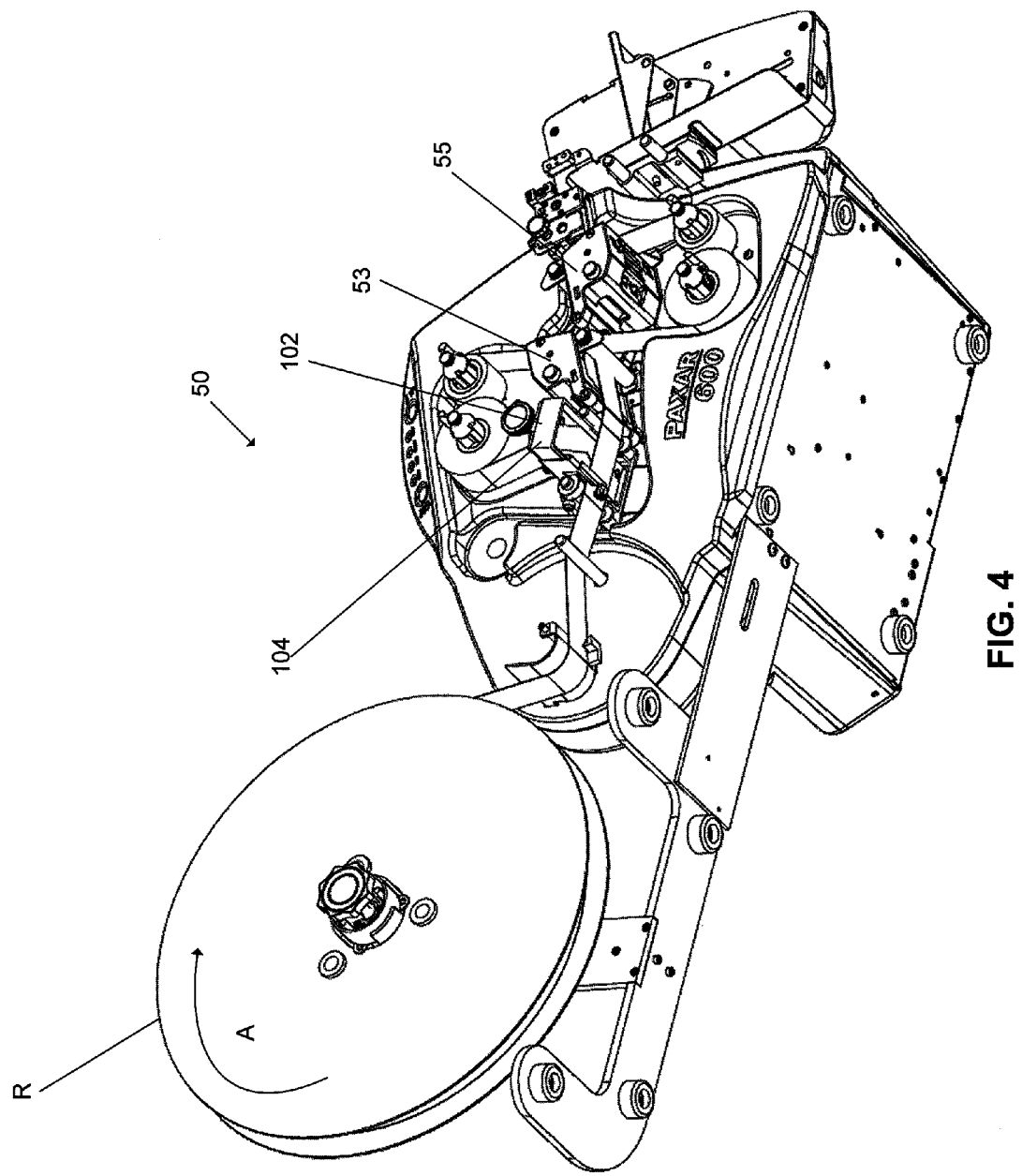
FIG. 4 is a bottom elevational view of a RFID printer in accordance with an aspect of the invention.

With reference initially to FIG. 1, there is shown a printer generally indicated at 50. While the invention is illustrated in connection with a thermal printer using dot heating elements to create images such as bar codes, graphics, alpha numeric characters and the like, the invention is also useful with printers such as ink jet, laser, xerographic, impact, and other types of printers. In the following description, the terms transponder and inlay are interchangeable. In addition, more than one inlay or transponder may be included in a record member.

FIGS. 1-4 illustrate a printer 50 for printing on a printable web W of record members RM in accordance with an aspect of the invention. The printer 50 may be a RFID printer. The web W is initially in the form of a wound supply roll R mounted on an unwind mechanism generally indicated at 52. The web W is drawn through the printer 50 in a direction generally from left to right. As the web W is paid out of the web roll R, the web roll R rotates clockwise in the direction of arrow A. The unwind mechanism 52 applies a slight tensioning force to the web W by attempting to rotate the roll R counterclockwise, that is, in a direction opposite to the direction of the arrow A. However, the force exerted on the web W to feed the web W through the printer 50 overcomes the force exerted by the unwind mechanism to enable the web W to be fed through the printer 50. By this arrangement the web W is always maintained under the desired tension.

In an aspect of the invention, RFID printer 50 includes a print head assembly having a print head 53' and a cooperable platen in the form of a platen roll 54. The RFID printer 50 also includes another print head assembly 55 having a print head 55' and a cooperable platen in the form of a platen roll 56. The print head assembly 53 and the platen roll 54 may be termed the "first" print head assembly and the "first" platen roll, respectively, because they are upstream of the print head assembly 55 and the platen roll 56. Similarly, the print head assembly 55 and the platen roll 56 are downstream of the print head assembly 53 and the platen roll 54 and may be termed the "second" print head assembly and the "second" platen roll. The print head assemblies 53 and 55 may be identical.

The thermal print head 53' at a side of the print head assembly 53 cooperates with the platen roll 54 to print on the underside of the web W. The thermal print head 55' at a lower side of the print head assembly 55 cooperates with the platen roll 56 to print on the upper surface of the web W.

The platen roll 54 is a non-driven or idler roll, but the platen roll 56 is a driven roll. During operation of RFID printer 50, the platen roll 56 feeds the web W from the roll R past a guide mechanism generally indicated at 57 to between the print head 53' and the platen roll 54 and to between the print head 55' and the platen roll 56. From there the web W passes to an auxiliary feed mechanism which feeds the web W to a cutter or cutter mechanism 59. The cutter 59 cuts the web W into predetermined length sheets, in particular labels or tags.

In an embodiment, RFID printer 50 is thermal transfer type printer, wherein ink ribbons I pass between the thermal print heads and the web W. A first ink ribbon system 62 is associated with the first print head assembly 53 and the platen roll 54, and a second ink ribbon system 63 in associated with the print head assembly 55 and the platen roll 56. The ink ribbon systems 62 and 63 may be identical. The systems 62 and 63 each have a supply spindle 64 and a take-up spindle 65 of similar construction. Each spindle 64 mounts a supply roll SR and each spindle 65 mounts a take-up roll TR. Each roll SR and TR is mounted on a core 66, and each spindle 64 and 65 is driven by a mechanism. Each system 62 and 63 may be microprocessor controlled.

In various aspects of the invention, record members RM are included on supply roll R. In an embodiment, the record members RM can be comprised of, for example, a web of paper or fabric labels, tags, or forms.

With continued reference to FIG. 1, each of the record members RM may include a RFID transponder. A typical transponder includes an integrated circuit chip and an antenna.

Figure 5:
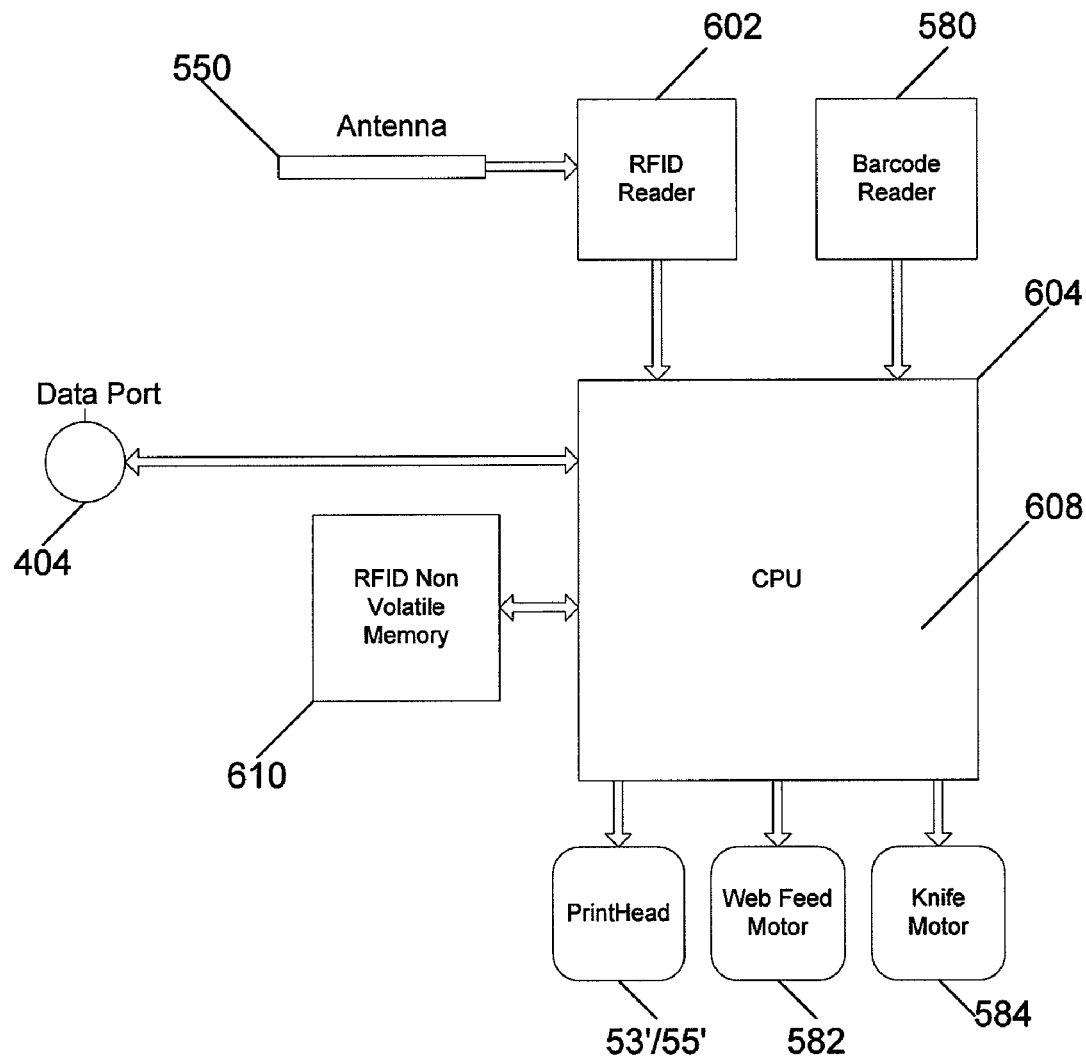
FIG. 5 illustrates a control block diagram for a RFID printer in accordance with an aspect of the invention.

In addition, FIG. 1 also shows an antenna assembly 102. The antenna assembly 102 may be located upstream of print head assemblies 53 and 55. The antenna assembly 102 may be comprised of a seamless aluminum box 104 (FIG. 4) to keep a generated RFID field focused. In an embodiment, the antenna assembly 102 may be located at a RFID reader. The antenna assembly 102 may radiate energy in a narrow beam towards an adjacent RFID transponder T that is aligned with an antenna 550 (FIG. 5). The RFID antenna 550 may radiate energy in response to a RFID module or reader 602 in order to read an adjacent RFID transponder. The RFID reader 602 is responsive to a controller 604 to drive the antenna 550 to read information from the adjacent RFID transponder T.

In an embodiment, the controller 604 includes a microprocessor 608 and memory 610. The memory 610 may include non-volatile memory for storing data and application programs for RFID printer 50.

FIG. 5 illustrates a control block diagram in accordance with an aspect of the invention. In FIG. 5, a printer may include a communication interface 404. In an embodiment, the communication interface 404 may include a radio frequency transceiver and/or one or more communication ports such as a RS 232 port, a serial port, USB port, firewire port, an infrared port, a parallel port, etc. . . . The communication interface 404 may allow the printer 50 to communicate with a host device to receive data therefrom or to transmit transaction data thereto. The communication interface 404 may enable RFID printer 50 to communicate with a host computer in real time. Alternatively, RFID printer 50 may be operated off-line such that the data received from a host computer is stored in a look-up table or the like in a memory of the printer for later use. Similarly, data may be entered via one or more of the input devices stored in a memory of the printer and later transmitted with a batch of data records to a host computer via a communication port 404.

In accordance with an embodiment of the invention, microprocessor 608 controls the operations of RFID printer 50 in accordance with an application program that is stored in memory. The microprocessor 608 may operate directly in accordance with the application program. Alternatively, the microprocessor 608 may operate indirectly in accordance with the application program as interpreted by an interpreter program stored in the memory.

Figure 6:
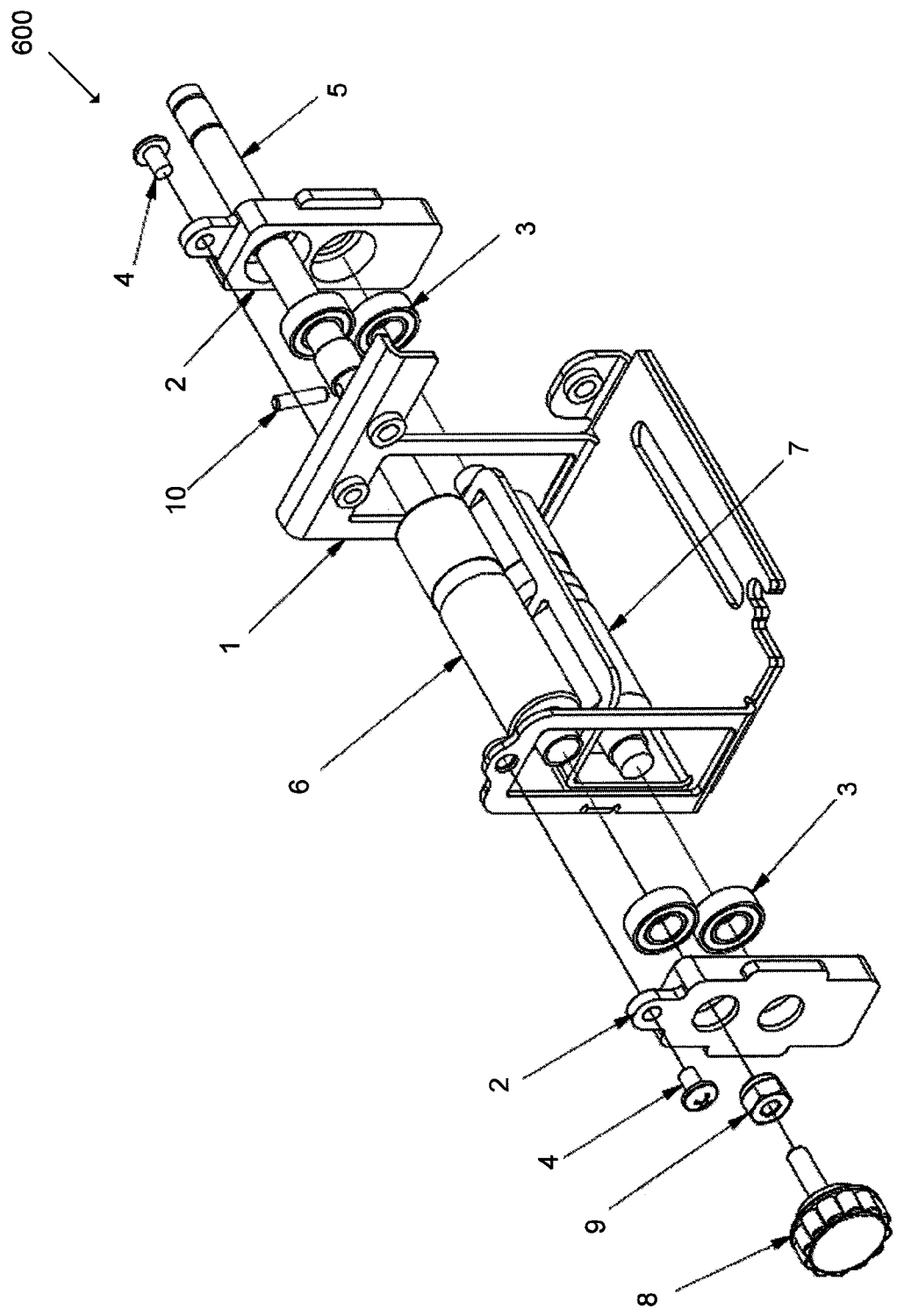
FIG. 6 is an elevational view of an under cut feed roller assembly for a RFID printer in accordance with an aspect of the invention.

FIG. 6 is an elevational view of an under cut feed roller assembly 600 for RFID printer 50 in accordance with an aspect of the invention. In FIG. 6, an under cut feed roller assembly comprises a drive frame 1 which supports a high friction or a grit roller 6 and a molded idler roller 7. The assembly may be designed such that the rollers 6 and 7 have grooves where transponders pass during the reading and printing process. The grooves may enable the RFID printer to reduce the amount of pressure placed on transponders moving along a web W. The under cut feed roller assembly further includes a set of ball bearings 3 and bearing supports 2. The ball bearing 3 may be mounted using various screws 4, nuts 9, and pins 10. The under cut feed roller assembly may be connected to a drive feed shaft 5 and may be adjusted for different webs by thumb screw knob 8.

Figure 7:
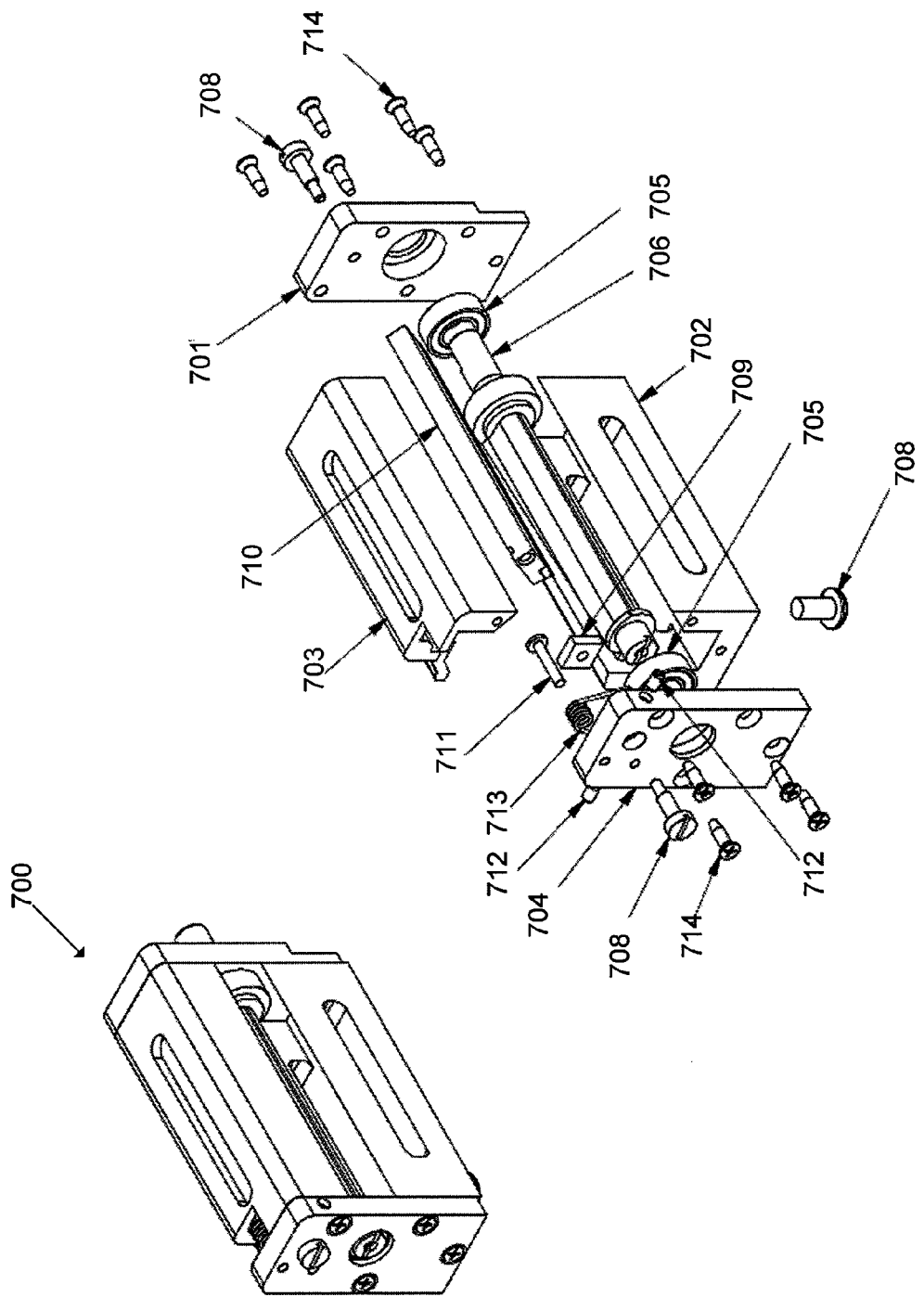
FIG. 7 is an elevational view of a knife assembly for a RFID printer in accordance with an aspect of the invention.

FIG. 7 is an elevational view of a knife assembly for a RFID printer 50 in accordance with an aspect of the invention. In FIG. 7, a knife assembly 700 comprises a rotary knife 706 and a twenty inch knife spacer 703. The knife assembly 700 may enable RFID printer 50 to produce a square cut without buildup of adhesive from different size record members. The knife assembly may further include a set of bearings 705, upright supports (701 and 704) and a knurled cup point 712. Further components of the knife assembly 700 may include a torsion spring 713 and various connection hardware including screws (707, 708, 714), rivet 711, and nuts 709.

Figure 8:
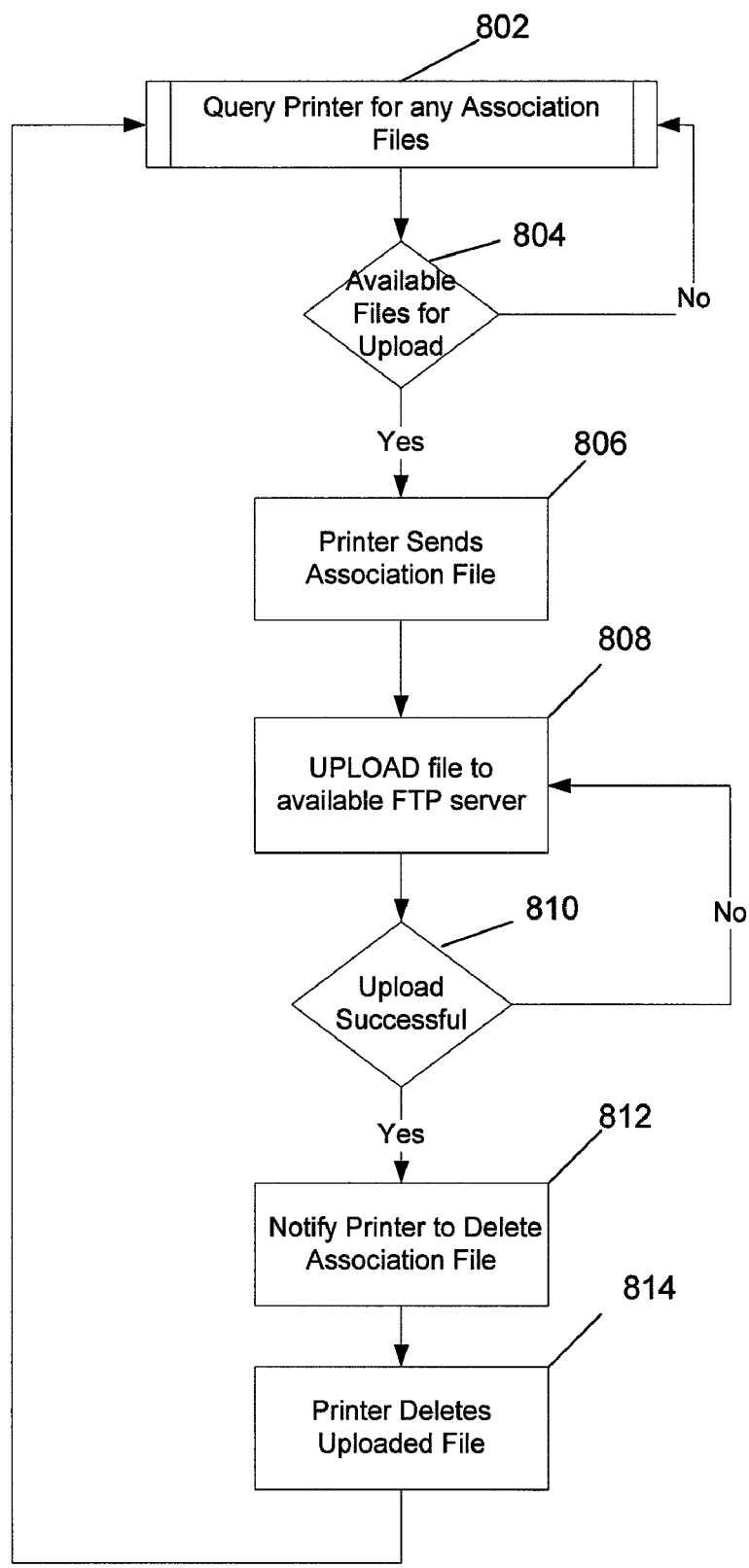
FIG. 8 illustrates a flow diagram for uploading an association file in accordance with an aspect of the invention.
Figure 9:
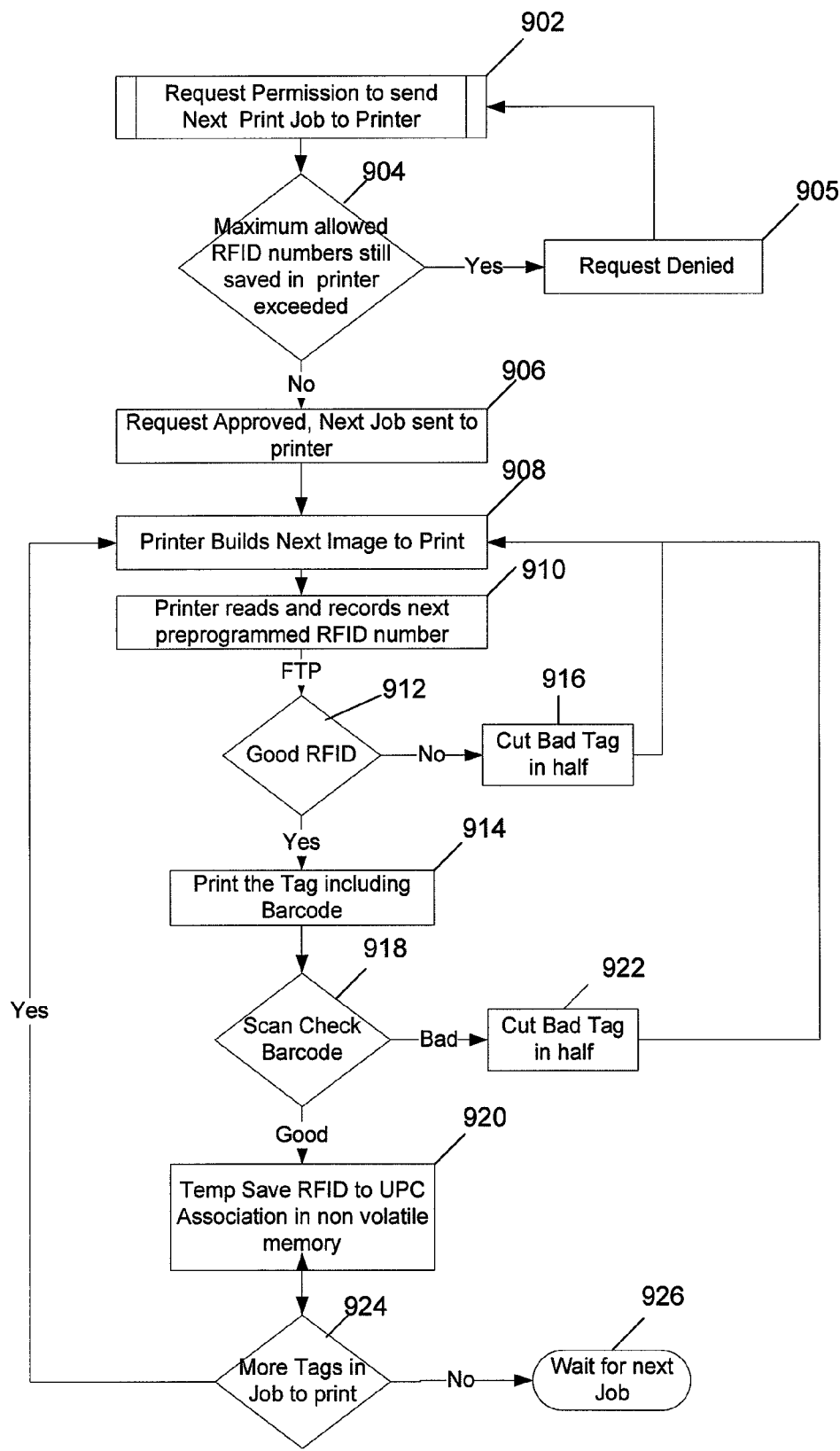
FIG. 9 illustrates a flow diagram showing printing functionality of a RFID printer in accordance with an aspect of the invention.
Figure 10:
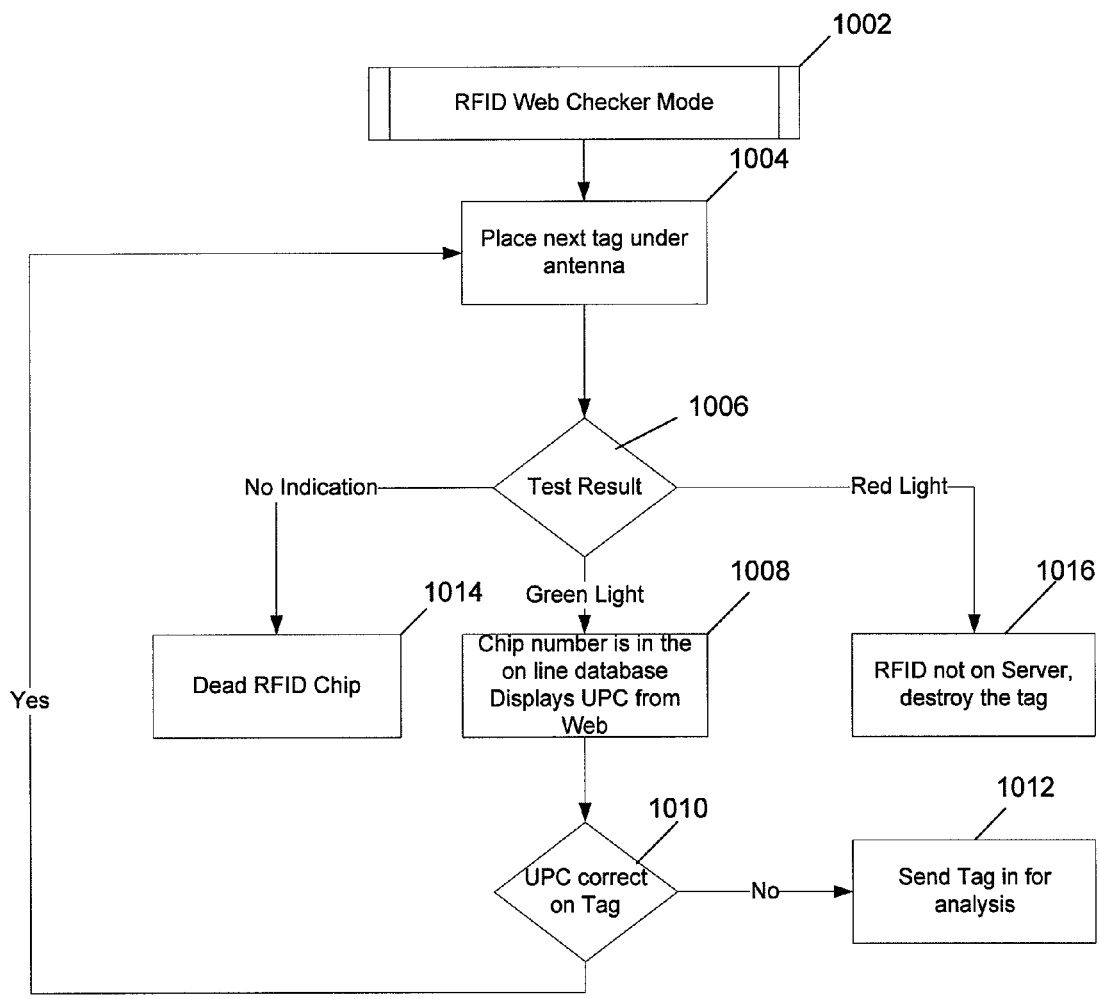
FIG. 10 illustrates a flow diagram for determining a measure of quality for a RFID transponder contained within a record member in accordance with an aspect of the invention.

FIGS. 8-10 describe flow charts which illustrate instructions in the form of computer-readable flow diagrams that may be implemented in various aspects of the invention by RFID printer 50. The instructions in the form of flow diagrams may be program instructions comprising a single program or may be divided into various program modules. The program instructions may be compiled into a processor-executable format and/or a format such that the instructions can be interpreted by an interpreter. In addition, the program modules may be combined or distributed in various computing environments.

FIG. 8 illustrates a flow diagram for uploading an association file in accordance with an aspect of the invention. In FIG. 8 at a step 802, a RFID printer may be queried for any completed association files. A completed association file may represent a file from a completed batch print job. In an embodiment, the batch print job may represent a contract from a RBO electronically forwarded through an FTP site to a tag or label supplier. The contract may be received, parsed, and stored in a database for use in creating a print job.

In step 804, a determination may be made regarding whether an association file is available for uploading. If an association file is available for uploading the process continues to step 806. If an association file is not available for uploading the process recycles to step 802.

Next, in step 806 the RFID printer 50 may transmit the association file to a host computer. The host computer may receive the association file and upload the association file to an available FTP server of a manufacturer or RBO. If the upload to the FTP server is successful the process continues to step 812. If the uploading is unsuccessful, the host continues to attempt to upload the association file to the FTP server.

The process continues to step 812 in which the host computer may notify the RFID printer 50 that the association file stored on the RFID printer may be deleted. In step 814, the RFID printer may delete the association file and the process continues to step 802.

In an aspect of the invention, the RFID printer may only be allowed to read and collect a predetermined number of RFID identification numbers as the RFID transponders pass under the RFID antenna 550 in the RFID printer 50. If the predetermined number is exceeded the RFID printer 50 may stop printing record members. For instance, the predetermined number of RFID identification numbers that may be collected before uploading to a FTP server may be approximately 20,000. Those skilled in the art will realize that the predetermined number of RFID identification numbers that may be collected before uploading to a FTP server may vary and change depending upon the requested print job.

FIG. 9 illustrates a flow diagram showing printing functionality of a RFID printer in accordance with an aspect of the invention. In FIG. 9 at step 902, RFID printer 50 may be asked if it is available for a next print job. A determination may be made by RFID printer 50 at step 904 as to whether RFID printer 50 has collected the maximum allowed RFID identification numbers saved in RFID printer 50 and not uploaded to an FTP server. If the maximum allowed number has been reached the print job may be refused and the process recycles to step 902. If the maximum number has not been reached then the process continues to step 906 where the print job is transmitted to RFID printer 50.

Next in step 908, RFID printer 50 may build the images to be printed. In step 910, the RFID printer 50 may read and record the next preprogrammed RFID number. At this point, the RFID printer 50 may be queried for any completed association files as described in FIG. 8.

Next, in step 912 a determination may be made regarding whether the RFID transponder is a good transponder. A quality measure may be implemented on RFID transponder to determine if the RFID transponder is functional. Such a quality measure may be, for example, a number of reads in a known RF field to determine status of the RFID transponder. If the RFID transponder is bad then in step 916, the record member including the bad transponder is cut in half and the process returns to step 908.

Returning to step 912, if the RFID transponder is good, then the record member having the RFID transponder may be printed upon. Next, the process may continue to step 918 where the printer barcode on the record member may be scanned. If the scanned barcode returns an unacceptable result, then the record member may be cut in half and the process continues to step 908.

If the scanned bar code returns an acceptable result, then the process may continue to step 920 where the recorded RFID transponder information and the barcode information may be linked and stored in non volatile memory. The linked information may be stored in an association file.

Next, the process may continue to step 924 for a determination if more tags are remaining in the print job to be printed. If it is determined in step 924 that more tags are to be printed then the process returns to step 908. If it is determined in step 924 that no more tags are to be printed then the process continues to step 926 to wait for the next print job.

In another aspect of the invention, RFID printer 50 may monitor the last four recorded transponder identifications codes and compare these recorded transponder identification codes to the next read transponder identification code. If a match occurs between the last four recorded transponder identification codes and the next read transponder identification code, then the tag having the later read transponder identification code is rejected and destroyed at the knife assembly. This may reduce any error due to reflection of the transponder identification code.

FIG. 10 illustrates a flow diagram for determining a measure of quality for a RFID transponder contained within a record member in accordance with an aspect of the invention. In FIG. 10, RFID printer 50 may be placed into a web checker mode. Next, in step 1004, a RFID transponder may be placed under the RFID printer antenna 550 to be read. The process may continue to step 1006 where a test result may be determined. The RFID printer may transmit information regarding the RFID transponder through a host computer and network so that information regarding the RFID transponder may be checked and verified.

In a first outcome step as illustrated in step 1014, the RFID transponder may not be functional. For example, the RFID printer may not be able to read the RFID transponder.

In a second outcome, shown in step 1016, information regarding the RFID transponder is not located in a RBO database. As the RBO does not have any information regarding the RFID transponder, RFID printer 50 may be instructed to cut the record member or tag into pieces so that it is not placed on a garment. A visual signal such as a red light may be displayed to indicate that the RFID transponder was not discovered at the RBO and that the RFID transponder should be destroyed.

In a third outcome shown in step 1008, the RFID transponder may be located in the RBO database and information regarding a corresponding barcode for the RFID transponder may be returned to the RFID printer 50. A visual signal such as a green light may be displayed to a user to indicate that the RFID transponder was discovered at the RBO. Next, in step 1010 a determination may be made as to whether the barcode stored in the RBO database matched the barcode printed on the record member. If the barcode printed on the record member matches the barcode listed in the RBO database, then the next RFID transponder may be placed under RFID printer antenna 550 to be read. If the barcode printed on the record member does not match the barcode, then information regarding the record member may be transmitted to a host computer for further analysis of the record member and RFID transponder.

The invention has been described in terms of exemplary embodiments. Numerous other embodiments, modifications and variations within the scope and spirit of the appended claims will occur to persons of ordinary skill in the art from a review of this disclosure.

We claim:

1. A Radio Frequency Identification (RFID) printer, comprising:
   a barcode scanner;
   a RFID reader;
   a communication interface;
   an antenna configured to emit a RFID field and coupled to and cooperating with the RFID reader to read from at least one RFID transponder included in a record member;
   a printing system having a print head and a drive mechanism to drive a web of RFID record members past the print head for printing data thereon;
   a memory; and
   a processor, the processor coupled to the memory, the printing system, the barcode scanner, the antenna, and to the RFID reader and operable to read and print on the RFID record members as the web continues in motion, the processor configured to perform the steps of:
      reading the at least one RFID transponder to collect an identification number from the RFID transponder;
      linking the identification number of the RFID transponder with a barcode;
      creating an association file, the association file including a listing of identification numbers of RFID transponders and associated barcodes;
      storing the association file in the memory;
      printing on the record members having at least one RFID transponder, the barcode linked to the collected transponder identification number;
      receiving an instruction to transmit the association file;
      transmitting the association file;
      counting the number of printed record members;
      determining if the counted number of printed record members exceeds a stored predetermined number before receipt of the instruction to transmit the association file and if the counted number of printed record members exceeds the stored predetermined number, halting printing until receipt of the instruction to transmit the association file;
      receiving another instruction to delete the association file from memory; and
      deleting the association file.

2. The RFID printer as recited in claim 1, wherein the barcode is a Universal Product Code (UPC).

3. The RFID printer as recited in claim 1, further comprising top and bottom feed rollers having matching grooves in a location where the RFID transponder passes.

4. The RFID printer as recited in clam 1, further comprising a knife assembly to produce a square cut when cutting RFID record members.

5. The RFID printer as recited in claim 1, wherein the antenna is located upstream of the print head.

6. The RFID printer as recited in claim 1, wherein the printing on the record member containing the RFID transponder occurs on both sides of the record member.

7. The RFID printer as recited in claim 1, wherein a total number of record numbers allowed to be printed before receipt of the instruction to transmit the association file comprises approximately 20,000 record members.

8. The RFID printer as recited in claim 1, wherein the antenna is housed in a metal box.

9. The RFID printer as recited in claim 8, wherein the metal box comprises an aluminum metal box.

10. A computer-readable medium containing computer-executable instructions for reading a Radio Frequency IDentification (RFID) transponder included in a record member advancing on a continuous moving web, the steps comprising:
   reading a RFID transponder to collect an identification number of the RFID transponder;
   linking the identification number of the RFID transponder with a barcode;
   creating an association file, the association file including a listing of identification numbers of RFID transponders and associated barcodes;
   storing the association file in memory;
   printing on the record member having the read RFID transponder, the barcode linked to the collected transponder identification number;
   receiving an instruction to transmit the association file;
   transmitting the association file;
      counting the number of printed record members;
      determining if the counted number of printed record members exceeds a stored predetermine number before receipt of the instruction to transmit the association file and if the counted number of printed record members exceeds the stored predetermined number, halting printing until receipt of the instruction to transmit the association file;
   receiving another instruction to delete the association file from memory; and
   deleting the association file.

11. The computer-readable medium as recited in claim 10, wherein total number of record numbers allowed to be printed before receipt of the instruction to transmit the association file comprises approximately 20,000 record members.

12. A method of printing Radio Frequency IDentification (RFID) record members, the method comprising:
   reading a RFID transponder to collect an identification number of the RFID transponder, the RFID transponder included in a record member;
   linking the identification number of the RFID transponder with a barcode;
   creating an association file, the association file including a listing of identification numbers of RFID transponders and associated barcodes;
   storing the association file in a memory;
   printing on the record member having the read RFID transponder, the barcode linked to the collected transponder identification number;
   receiving an instruction to transmit the association file;
   transmitting the association file;
      counting the number of printed record members;
      determining if the counted number of printed record members exceeds a stored predetermine number before receipt of the instruction to transmit the association file and if the counted number of printed record members exceeds the stored predetermined number, halting printing until receipt of the instruction to transmit the association file;
   receiving another instruction to delete the association file from the memory; and
   deleting the association file.

13. The method of claim 12, wherein total number of record numbers allowed to be printed before receipt of the instruction to transmit the association file comprises approximately 20,000 record members.

* * * * *